United States Patent [19]

Gassmann

[11] Patent Number: 4,811,610
[45] Date of Patent: Mar. 14, 1989

[54] WEIGHING CELL

[75] Inventor: Helmut Gassmann, Seeheim-Jugenheim, Fed. Rep. of Germany

[73] Assignee: GTM Gassmann Theiss Messtechnik GmbH, Seeheim-Jugenheim, Fed. Rep. of Germany

[21] Appl. No.: 186,014

[22] Filed: Apr. 25, 1988

[30] Foreign Application Priority Data

May 1, 1987 [DE] Fed. Rep. of Germany ....... 3714613

[51] Int. Cl.$^4$ ........................... G01L 1/22; G01G 3/14
[52] U.S. Cl. ................................... 73/862.65; 177/211
[58] Field of Search ....................... 177/211; 73/862.65

[56] References Cited

U.S. PATENT DOCUMENTS 3,601,209  8/1971  Paelian ........................... 177/211 X
3,706,349 12/1972  Paelian et al. .................... 177/211
3,871,216  3/1975  Eder ............................. 73/862.65

FOREIGN PATENT DOCUMENTS 1268878 5/1968 Fed. Rep. of Germany .
1648375 2/1972 Fed. Rep. of Germany .

OTHER PUBLICATIONS

New Developments in Force Measurement, by Joseph H. Antkowlak & Harry E. Lockery, W&M, Feb. 1987.

Primary Examiner—George H. Miller, Jr.
Attorney, Agent, or Firm—Body, Vickers & Daniels

[57] ABSTRACT

A weighing cell, in which the load introduced is measured by recording the tangential deformations of an annular deformation body which is supported freely on both sides and which is connected, by means of narrow annual webs acting as elastic joints, to the force introduction element on the one hand and to the force absorption element on the other hand, virtually no bending moments being transmitted in the region of the elastic joints and external disturbing forces having no influence on the weighing.

7 Claims, 2 Drawing Sheets

WEIGHING CELL

BACKGROUND OF THE INVENTION

1. Field of the Invention

The invention relates to a weighing cell with a force introduction element and a force absorption element which are connected by means of force transmission members to an annular deformation body arranged between them. On both sides of its mid-plane, the deformation body has mechanical/electrical transducer elements arranged at an axial distance from one another and converting mechanical deformations of the body into electrical quantities.

2. Description of the Prior Art

In weighing cells of this type, the amount of force introduced is measured by means of the tangential deformations experienced by a bending ring, at the inner edge of which the load is introduced and which is supported at its outer edge on a force absorption element. The compression or expansion of surfaces of the ring which are arranged at an axial distance from one another on opposite sides of a mid-plane, when the ring bends, are absorbed by the transducer elements and converted by these into electrical measuring signals which can be amplified and displayed in a suitable way.

In one such known weighing cell (German Patent Specification No. 1,268,878), the force transmission members are thin-walled cylindrical tubular pieces which are connected at one edge to the deformation body and at the other edge to the force introduction element or the force absorption element and which transmit the force from the former to the latter tangentially in the direction of the generatrices of the cylindrical tubular pieces. Because of the high rigidity of the tubular force transmission members and as a result of the complicated deformations which these tubular pieces experience during force transmission, high restraining moments are generated. Furthermore, high stress peaks occur at the points where the tubular force transmission members merge into the deformation body. These high stresses lead, in turn, to inelastic deformations and to hysterisis phenomena and have the effect of impairing the measuring accuracy.

There is also a known weighing cell (U.S. Periodical W & M, 1987, pages 19–22), in which the force introduction element and the force absorption element are connected to one another by means of an annular disk, from which is fashioned, by means of lathe-turned recesses on the top side and on the underside, a deformation body of approximately rectangular cross-section, the height of which corresponds to the thickness of the annular disk at its inner and outer edges where the latter merges into the force introduction element and the annular force absorption element respectively. Since the annular disk is connected rigidly in terms of bending to the force introduction element on the one hand and to the force absorption element on the other hand and angular twists are possible only in the region of the lathe-turned recesses next to the deformation body, disturbing moments are transmitted to the deformation body and to the transducer elements fastened to it which are caused, for example, by an eccentric introduction of the load into the force introduction element or an eccentric mounting of the force absorption element. These disturbing forces vary, in places, the bending moment exerted on the deformation body and thus influence the tangential stresses taking effect there and originating from the load, thus leading to a falsification of the measurement result.

SUMMARY OF THE INVENTION

The object of the invention is to avoid these disadvantages and provide a weighing cell which works with great accuracy and which can be produced with small dimensions and at low cost in such a way that disturbing variables occurring during load introduction and in the mounting of the weighing cell are eliminated virtually completely.

In the invention, the force transmission members are narrow annular webs, the smallest thickness of which is at most 1/6 of the height of the deformation body and the width of which, measured at a distance of double the web thickness from the mid-plane of the web, is no greater than $\frac{1}{3}$ of the width of the deformation body, measured between the points of the smallest web thickness.

The narrow webs between the annular deformation body, on the one hand, and the force introduction element and force absorption element respectively, on the other hand, form elastic joints, in which only very small restraining moments can occur. There are therefore no inelastic deformations and also no hysteresis phenomena in this region, thus guaranteeing a high accuracy of the weighing cell. What is achieved above all, however, is that variations in the location of the introduction of force into the force introduction element or an eccentric mounting of the force absorption element can no longer influence the tangential stresses of the deformation body and consequently the force measurement.

An especially simple embodiment which is easily produced, is achieved if the force introduction element, the force absorption element and the deformation body are made in one piece and the webs are limited by annular grooves which are fashioned between the deformation body, on the one hand, and the force introduction element and force absorption element respectively, on the other hand. The basic body of the weighing cell can thus be produced as a simple lathe-turned part.

Especially simple forms are obtained if the annular grooves have a base which is in the form of an arc of a circle or parabolic in cross-section. It is particularly expedient, however, if at least one annular groove has a base of triangular cross-section. If this triangular annular groove is shaped so that its apex line is in the region of the zero line of the stress field generated in the web as a result of force transmission, it is possible for the restraining moments in the joint region to become virtually zero. In this case, the triangular annular groove is usually asymmetric, that is to say its apex line is not in the center of the groove bottom.

BRIEF INTRODUCTION OF THE DRAWINGS

Preferred embodiments of the invention will now be described by way of non-limitative example, with reference to the accompanying diagrammatic drawings, in which:

FIG. 1 shows a cross-section through a weighing cell according to the invention in a diagrammatic representation, FIG. 2 shows another embodiment of a weighing cell according to the invention, intended for higher loads, in a representation corresponding to that of FIG. 1, FIG. 3 shows, on a greatly enlarged scale, a detail of FIG. 1 which reveals the design of the elastic joint between the deformation body and the force absorption element, FIG. 4 shows another embodiment of an elastic joint in a representation corresponding to that of FIG. 3, FIG. 5 shows a third embodiment of the elastic joint in a representation corresponding to that of FIG. 3, and FIG. 6 shows, in a diagrammatic representation, a diametral section through a bending ring serving as a deformation body, in the deformed and nondeformed state.

DESCRIPTION OF THE PREFERRED EMBODIMENTS

Figure 1:
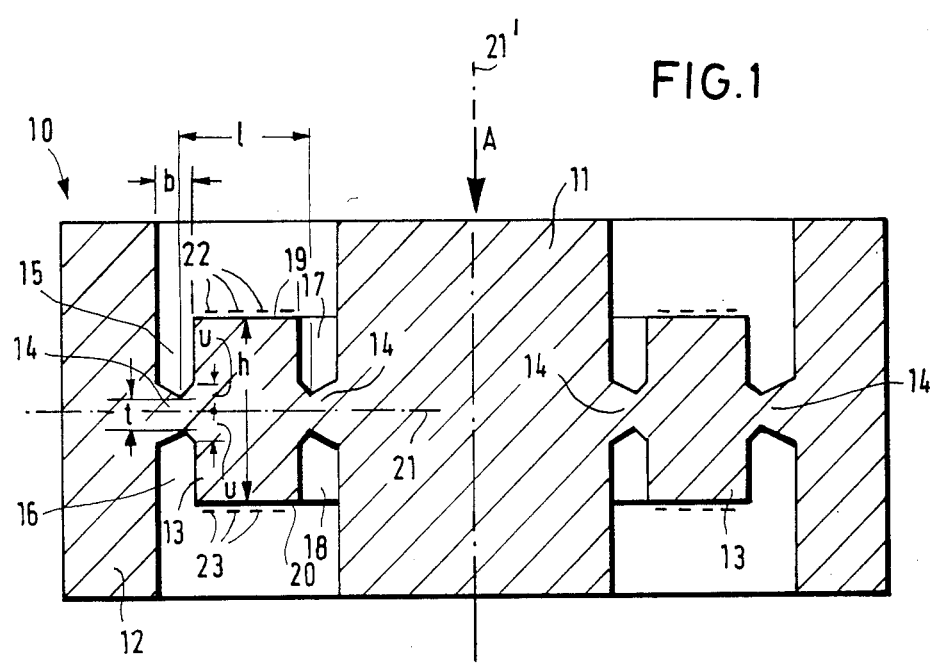

In FIG. 1, 10 denotes a weighing cell which is fashioned from a one-piece cylindrical block and which is composed of a central force introduction element 11, an outer annular force absorption element 12 and an annular deformation body 13 which is arranged in the annular space between force introduction element 11 and force absorption element 12 and which is connected to these elements by means of force transmission members 14. These force transmission members are narrow annular webs which are formed as a result of the fashioning of annular grooves 15, 16 and 17, 18 between the deformation body 13, on the one hand, and the force absorption element 12 and force introduction element 11 respectively, on the other hand.

The annular deformation body 13 can have different cross-sectional forms and, depending on the amount of the load to be transmitted, different heights. In the embodiment illustrated in FIG. 1, the deformation body 13 is a bending ring of rectangular cross-section, the height h of which is greater than its width 1 measured radially and of which the upper ring face 19 and lower ring face 20 are at the same axial distance from the mid-plane 21 of the ring, which passes through the webs 14 which connect the deformation body 13 to the force introduction element 11 and to the force absorption element 12.

Fastened on the upper ring face 19 and the lower ring face 20 which, in the exemplary embodiment illustrated, are parallel to one another and extend perpendicularly to the mid-axis 21' of the weighing cell, but can also be inclined relative to this axis, are mechanical/electrical transducer elements 2 and 23 which, for example, can be strain gauges distributed over the ring, but are preferably measuring-wire spirals which are connected firmly, for example glued, over their entire lengths to the upper and lower ring faces 19 and 20. The upper and lower wire spirals 22 and 23 are combined in a bridge circuit in a way known per se, and the electrical measuring signals generated by them are processed in a display unit not shown in detail.

So that the annular deformation body 13 can bend as free of constraint as possible during load transmission, and so that no disturbing moments originating from an asymmetric load introduction or mounting of the weighing cell are introduced, the annular webs 14 are as narrow and as thin as possible. According to the invention, the smallest thickness t of each web should not be more than 1/6 of the height h of the deformation body 13, the height h of the deformation body being taken as the mean distance between the ring faces 19 and 20, on which the mechanical/electrical transducer elements 22 and 23 are arranged. It can also be seen from FIG. 1 that the width b of the annular webs is considerably less than the width 1 of the deformation body 13, measured diametrically between the points where the inner web and the outer web have their smallest thickness t. According to the invention, the width b of the webs should be at most ⅓ of the width 1 of the deformation body, this width b being measured at a vertical distance u from the mid-plane 21 of the web 14 which corresponds to the smallest web thickness t. If these conditions are maintained, the annular webs 14 act as elastic joints, in which only transverse forces, but virtually no bending moments can be transmitted.

Figure 3:
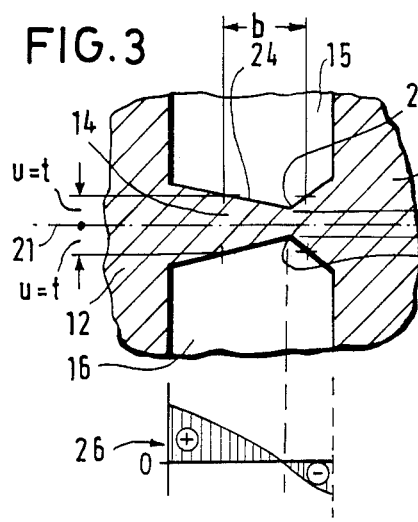

An especially favorable form of the web 14 is obtained if the upper and lower annular grooves 15, 16 and 17, 18 respectively located opposite one another and forming a web 14 have a base 24 of triangular cross-section, which is shaped so that its apex line 25 is in the region of the zero line 0 of the stress field 26 generated in the web 14 as a result of the force transmission (FIG. 3).

Figure 4:
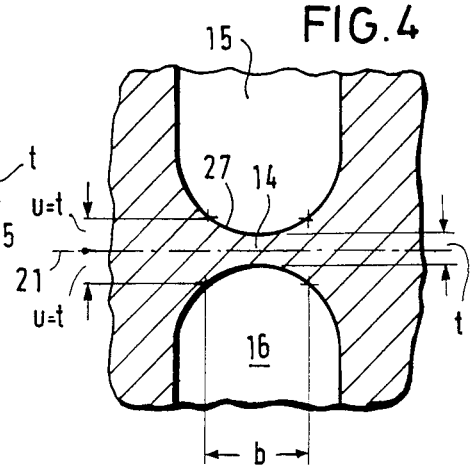
Figure 5:
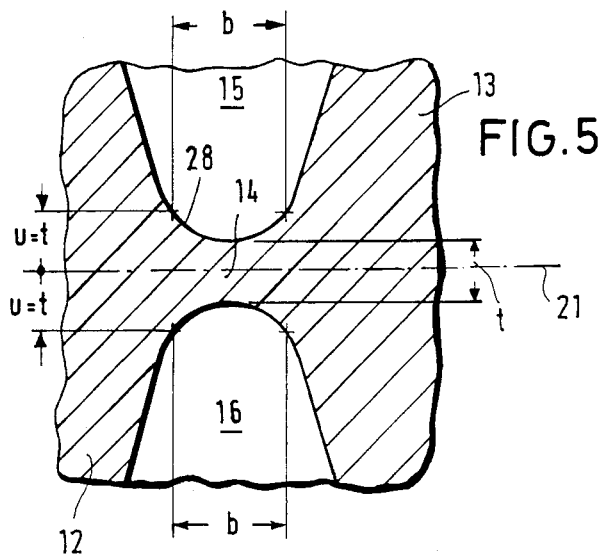

Other embodiments of the webs 14 are shown in FIGS. 4 and 5, where these webs are limited by annular grooves 15 which have a base 27 of a cross-section in the form of an arc of a circle (FIG. 4) or a base 28 of parabolic cross-section (FIG. 5). Here, too, the width b of the webs 14 limited by curved surfaces is to be measured at a distance u from the mid-plane 21 of the web 14 which corresponds to the web thickness t. If the top side and underside of a web 14 are limited by surfaces of different shapes, a mean value can be formed from the widths b measured above and below the web 14 at the distance t from the mid-plane 21.

Figure 2:
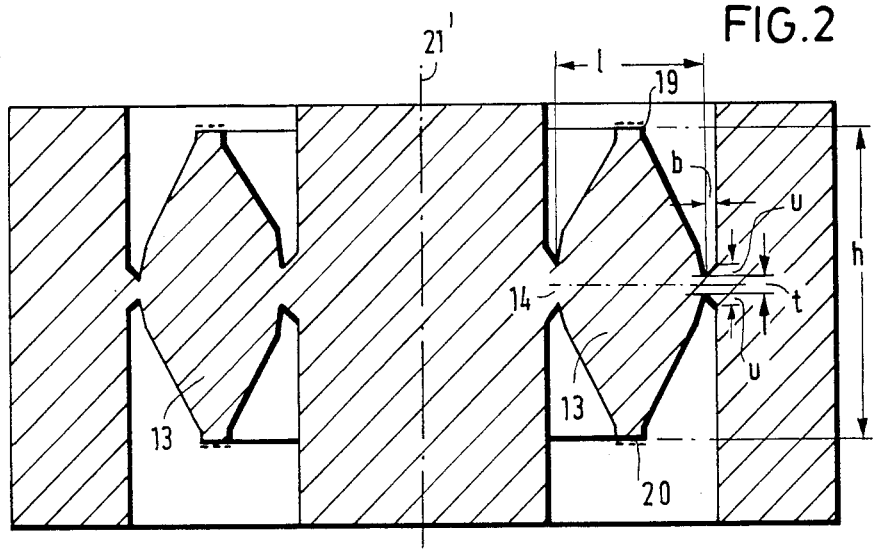

FIG. 2 shows a somewhat different embodiment of a weighing cell according to the invention, in which the deformation body has an approximately rhombic-shaped cross-section. Here, the upper ring face 19 and the lower ring face 20 are at a greater axial distance from one another, but have a small radial width in relation to the height h. Here, too, the annular webs 14 are very narrow in relation to the total width 1 of the deformation body 13, and their thickness t is likewise very small in relation to the height h of the deformation body. Weighing cells of this design are especially suitable for measuring high forces or for weighing heavy loads.

Figure 6:
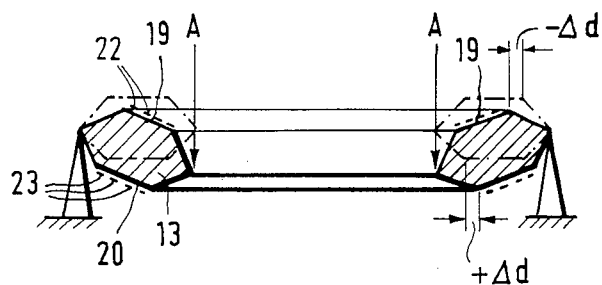

The mode of operation of the weighing cell according to the invention is explained in detail with reference to FIGS. 1 and 6:

When a load A acts on the force introduction element, it is transmitted via the inner annular web 14 to the deformation body 13. Since the latter is connected to the force absorption element 12 via the outer annular web 14 and is thereby held in position at its outer periphery, the deformation body 13 bends and assumes the position which is hatched and represented by unbroken lines in FIG. 6 and in which the upper ring face 19 of the deformation body 13 has moved inwards by the amount $-\Delta d$ and the lower ring face 20 has moved outwards by the amount $+\Delta d$. The upper ring face 19 has therefore become smaller, whereas the lower ring face has become larger. The upper ring face has thus been compressed in the tangential direction, whilst the lower ring face 20 has been expanded in the tangential direction. This tangential compression and expansion respectively of the upper and lower ring faces is transmitted to the mechanical/electrical transducer elements which are connected firmly to these and which consequently emit an electrical signal which is proportional to the expansion or compression and which can be displayed as a measure of the transmitted force.

The invention is not restricted to the preferred embodiments illustrated and described, but several changes and additions are possible, without departing from the scope of the invention. For example, the cross-sectional form of the bending ring serving as a deformation body can also be circular, elliptic or hexagonal. It is also possible for the ring faces, on which the mechanical-/electrical transducer elements are arranged, to be located inside the deformation body or for these ring faces to be inclined relative to the midaxis of the weighing cell. The shape of the annular grooves which limit the annular webs can also take another, for example trapezoidal form. Furthermore, the inner web ring can be arranged axially offset relative to the outer web ring in the direction of the force to be introduced into the force introduction element, although it is usually more expedient to arrange both web rings in the same diametral plane of the deformation body.

What I claim is:

1. A weighing cell comprising
   a force introduction element for bearing a load;
   a force absorption element spaced from said force introduction element;
   an annular deformation body having a height h and a width l, arranged between said force introduction element and said force absorption element;
   transducer elements mounted on said deformation body at an axial distance apart for converting mechanical deformation into electrical quantities;
   force transmission members connecting said annular deformation body to said force introduction element and said force absorption element respectively, which members comprise annular webs having a mid-plane and a smallest thickness t and a width b wherein $$t \leq 1/6\, h$$

and $$b \leq \tfrac{1}{3} l$$

when b is measured at a distance $u = t$ from said mid-plane of the annular web and l is measured between the points of smallest web thickness.

2. A weighing cell as claimed in claim 1, wherein the webs are arranged diametrically opposite one another in the region of the mid-plane of the deformation body.

3. A weighing cell as claimed in claim 1, wherein the force introduction element, force absorption element and deformation body are made in one piece, and the deformation body is delimited by annular grooves which are located between the deformation body, on the one hand, and the force introduction element and force absorption element respectively, on the other hand.

4. A weighing cell as claimed in claim 3, wherein at least one said annular groove has a base having a cross-section in the form of an arc of a circle.

5. A weighing cell as claimed in claim 3, wherein at least one said annular groove has a base of parabolic cross-section.

6. A weighing cell as claimed in claim 3, wherein at least said one annular groove has a base of triangular cross-section.

7. A weighing cell as claimed in claim 6, wherein the triangular annular groove is shaped so that its apex line is in the region of the zero line of the stress field generated in the web as a result of the force transmission.

* * * * *